(12) United States Patent
Eisenberg et al.

(10) Patent No.: US 6,469,132 B1
(45) Date of Patent: *Oct. 22, 2002

(54) DIBLOCK COPOLYMER AND USE THEREOF IN A MICELLAR DRUG DELIVERY SYSTEM

(75) Inventors: Adi Eisenberg; Dusica Maysinger; Christine Allen, all of Montreal (CA)

(73) Assignee: McGill University, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/563,380

(22) Filed: May 3, 2000

Related U.S. Application Data (60) Provisional application No. 60/132,683, filed on May 5, 1999.

(51) Int. Cl.$^7$ .............................................. C08G 63/08
(52) U.S. Cl. ...................................... 528/354; 528/355
(58) Field of Search ............................... 528/354, 355; 525/408

(56) References Cited

U.S. PATENT DOCUMENTS

| | | | | |
|---|---|---|---|---|
| 4,130,517 A | * | 12/1978 | Lundberg et al. | 528/354 |
| 4,857,602 A | * | 8/1989 | Casey et al. | 525/408 |
| 5,100,433 A | * | 3/1992 | Bezwada et al. | 606/230 |
| 5,378,540 A | * | 1/1995 | Olson | 428/395 |
| 5,514,380 A | * | 5/1996 | Song et al. | 424/426 |
| 5,525,702 A | * | 6/1996 | Nace | 528/354 |
| 5,607,686 A | * | 3/1997 | Totakura et al. | 523/118 |
| 6,136,333 A | * | 10/2000 | Cohn et al. | 424/423 |
| 6,143,037 A | * | 11/2000 | Goldstein et al. | 623/66 |

OTHER PUBLICATIONS

Gregoriadis, G., "Engineering Liposomes for Drug Delivery: Progress and Problems", (1995) *TIBS*, 13:527–537.

Muller, R.H., "Colloidal Carriers for Controlled Drug Delivery and Targeting: Modification, Characterization and In vivo Distribution", (1991) *CRC Press Inc.*, Florida.

Kabanov, A.V. et al., "Micelles of Amphiphilic Block Copolymers as Vehicles for Drug Delivery", (1997) In *Amphiphilic Block Copolymers: Self–assembly and Applications* edited by Alexandris, P. et al., Netherlands.

Kwon, G. et al., "Block Copolymers Micelles for Drug Delivery: Loading and Release of Doxorubicin", (1997) *Journal of Controlled Release*, 48: 195–201.

La, S.B. et al., "Preparation and Characterization of the Micelle–Forming Polymeric Drug Indomethacin–Incorporated Poly(ethylene oxide)–Poly(β–benzyl L–aspartate Block Copolymer Micelles", (1996) *Journal of Pharmaceutical Sciences*, 85:85–90.

Kataoka, K. et al., "Block Copolymer Micelles as Vehicles for Drug Delivery", (1993) *Journal of Controlled Release*, 24:119–132.

Bader, H. et al., "Watersoluble Polymers in Medicine", (1984) *Angerwandte Makromolekulare Chemie*, 123:457–485.

Zhang, L. et al., "Ion–Induced Morphological Changes in "Crew–cut" Aggregates of Amphiphilic Block Copolymers", (1996) *Science*, 272:1777–1779.

Zhang, L. et al., "Multiple Morphologies of "Crew–cut" Aggregates of Polystyrene–b–poly(acrylic acid) Block Copolymers", (1995) *Science*, 268:1728–1731.

Elbert, D.L. et al., "Surface Treatments of Polymers for Biocompatibility", (1996) *Annu. Rev. Mater. Sci.*, 26:365–394.

Lee, J.H. et al., "Blood Compatibility of Polyethylene Oxide Surfaces", (1995) *Prog. Polym. Sci.*, 20:1043–1079.

Zhao, J. et al., "Partitioning of Pyrene between 'Crew Cut' Block Copolymer Micelles and H$_2$O/DMF Solvent Mixtures", (1997) *Macromolecules*, 30:7143–7150.

Butcher, S.P. et al., "Neuroprotective Actions of FK506 in Experimental Stroke: In Vivo Evidence against an Antiexcitotoxic Mechanism", (1997) *Journal of Neuroscience*, 17:6939–6946.

* cited by examiner

*Primary Examiner*—P. Hampton-Hightower
(74) *Attorney, Agent, or Firm*—Swabey Ogilvy Renault; Jennifer Quinn; France Côté

(57) ABSTRACT

The present invention relates to diblock copolymers and more particularly to polycaprolactone-b-polyethylene oxide (PCL-b-PEO) diblock copolymers used in micellar systems, for delivering a biologically active agent to a site. There is provided a diblock copolymer compound comprising a hydrophilic block and a hydrophobic block, the hydrophilic block comprising a polyethylene oxide (PEO) polymer, the hydrophobic block comprising a polycaprolactone (PCL) polymer, the PCL polymer comprising a number of caprolactone monomers selected from 5 to 150, the PEO polymer comprising a number of ethylene oxide monomers selected from 30 to 100. The diblock copolymer compound of the present invention may be used to form a micellar delivery system for delivering biologically active agents such as lipophilic drugs to sites such as the central nervous system. The hydrophobic reservoir obtained enables a larger amount of agent to be incorporated therein, with a slower release and without the damaging effects that such high doses would induce with known delivery systems.

5 Claims, 9 Drawing Sheets

DIBLOCK COPOLYMER AND USE THEREOF IN A MICELLAR DRUG DELIVERY SYSTEM

This Application claims benefit of Prov. No. 60/132,683 filed May 5, 1999.

BACKGROUND OF THE INVENTION (a) Field of the Invention

The present invention relates to diblock copolymers and more particularly to polycaprolactone-b-polyethylene oxide (PCL-b-PEO) diblock copolymers used in micellar systems.

(b) Description of Prior Art

Colloidal drug delivery vehicles such as liposomes, microspheres, nanospheres and block copolymer micelles increase the therapeutic index and improve the selectivity of various potent drugs (Gregoriadis G., (1995) *TIBS,* 13:527–537; Muller R. H., (1991) *Colloidal Carriers for Controlled Drug Delivery and Targeting: Modification, Characterization and In vivo Distribution,* CRC Press Inc., Florida; Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands; Kwon G. et al. (1997) *J. Controlled Release,* 48:195–201; La S. B. et al. (1996) *Journal of Pharmaceutical Sciences,* 85:85–90; Kataoka K. et al. (1992) *J. Control. Release,* 24:119–132). These vehicles optimize the therapeutic efficacy of drugs by preventing their rapid elimination from the body, reducing their systemic toxicity, delaying their degradation and optimizing their metabolism (Muller R. H., (1991) *Colloidal Carriers for Controlled Drug Delivery and Targeting: Modification, Characterization and In vivo Distribution,* CRC Press Inc., Florida; Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands). In addition, they also provide for effective delivery of drugs to specific target sites (Muller R. H., (1991) *Colloidal Carriers for Controlled Drug Delivery and Targeting: Modification, Characterization and In vivo Distribution,* CRC Press Inc., Florida) and aid in overcoming both transport limitations and defense mechanisms associated with the multi-drug resistance phenotype.

It is known to use micellar systems formed from block copolymers in drug delivery (Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands; Kwon G. et al. (1997) *J. Controlled Release,* 48:195–201; La S. B. et al. (1996) *Journal of Pharmaceutical Sciences,* 85:85–90; Kataoka K. et al. (1992) *J. Control. Release,* 24:119–132; Bader H., Ringsdorf H., Schmidt B., (1984) *Angewandte Makromolekulare Chemie,* 123:457–485). Copolymers are formed from two or more monomeric units which, following polymerization, are arranged in a specific manner depending on the type of copolymer desired. Block copolymers consist of a block or sequence of one repeat unit coupled to a block of another repeat unit.

Micelles are formed from individual block copolymer molecules, each of which contains a hydrophobic block and a hydrophilic block. The amphiphilic nature of the block copolymers enables them to self-assemble to form nanosized aggregates of various morphologies in aqueous solution such that the hydrophobic blocks form the core of the micelle, which is surrounded by the hydrophilic blocks, which form the outer shell (Zhang L. Eisenberg A. (1995) *Science,* 268:1728–1731; Zhang L, Yu K., Eisenberg A. (1996) *Science,* 272:1777–1779). The inner core of the micelle creates a hydrophobic microenvironment for the non-polar drug, while the hydrophilic shell provides a stabilizing interface between the micelle core and the aqueous medium. The properties of the hydrophilic shell can be adjusted to both maximize biocompatibility and avoid reticuloendothelial system uptake.

The size of the micelles is usually between 10 nm and 100 nm (Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands). This size is small enough to allow access to small capillaries while avoiding reticuloendothelial system uptake (Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands). Micelles in this size range are also large enough to escape renal filtration, which increases their blood circulation time.

Existing block copolymer micelle systems are based on polyethylene oxide-b-polypropylene oxide-b-polyethylene oxide triblock copolymer or on block copolymers which have a polypeptide or polylactic acid core-forming block and a polyethylene oxide block which forms the hydrophilic corona (Kabanov A. V., Alakhov V. Y. (1997) "Micelles of Amphiphilic Block Copolymers as Vehicles for Drug Delivery" In *Amphiphilic Block Copolymers: Self-Assembly and Applications* edited by Alexamdris P., Lindman B., Elsevier, Netherlands; Kwon G. et al. (1997) *J. Controlled Release,* 48:195–201; La S. B. et al. (1996) *Journal of Pharmaceutical Sciences,* 85:85–90; Kataoka K. et al. (1992) *J. Control. Release,* 24:119–132).

Polycaprolactone and polyethylene oxide are used in a variety of biomedical applications (Elbert D. L., Hubbell J. A., (1996) *Annu. Rev. of Mater. Sci.,* 26:365–394; Lee J. H. et al. (1995) Prog. *Polym. Sci.,* 20:1043–1079). Polycaprolactone is a synthetic semicrystalline biodegradable polymer that, due to its biodegradability, has been tried both as a structural material in the production of medical devices such as implants, sutures, stents and prosthetics, and as a carrier for a variety of drugs. Polycaprolactone pastes have been developed as a drug delivery system for the anti-cancer agent taxol and the anti-neoplastic agent bis(maltolato) oxovanadium. Nanoparticle, nanocapsule and microparticle drug carriers made of polycaprolactone have been assayed for the ocular delivery of indomethacin. Polyethylene oxide is commonly used to impart blood compatibility to a material surface (Elbert D. L., Hubbell J. A., (1996) *Annu. Rev. of Mater. Sci.,* 26:365–394; Lee J. H. et al. (1995) Prog. *Polym. Sci.,* 20:1043–1079).

Triblocks of polycaprolactone-b-polyethylene oxide-b-polycaprolactone (PCL-b-PEO-b-PCL) have been used to form tablets. Matrices to be used as implants for drug delivery systems have been formed from $PCL_6$-b-$PEO_{90}$-b-$PCL_6$.

The use of diblock copolymer micelles of methoxy poly (ethylene glycol) and $\Sigma$-caprolactone as a drug delivery system is known.

The transport of a biologically active agent to a specific site requires a vehicle which is properly armed to confront the many obstacles or barriers it will face within the body. For this, the drug carrier must be tailor-made to suit a particular application. For example, drug accessibility to the central nervous system (CNS) is limited by the blood-brain barrier and major obstacles to delivering drugs to the CNS include the biocompatibility of the materials used and a control of the release kinetics of the drug delivery system used. There lacks an adequate means of long-term delivery to the CNS.

The FK506 drug, otherwise known as tacrolimus or Prograf™, has been effectively used to achieve immunosuppression in organ transplant recipients. FK506 binds to the immunophilin FKBP12 to form a complex which binds to and inhibits calcineurin; this, in turn, results in immunosuppression. FK506 promotes neuronal outgrowth in terms of the enhancement of neurite extension in PC 12 (rat pheochromocytoma) cell cultures and explant cultures of rat sensory ganglia. However, the use of FK506 for the treatment of neurodegenerative diseases is limited by its immunosuppressant activity.

At present, FK506 is administered either orally, in a capsule, or by injection as a sterile solution. A microemulsion formulation of FK506 has also been developed.

L-685,818 is a structural analogue to FK506. L-685,818 has retained the neurotrophic action of FK506 but has lost its immunosuppressant action. The structural difference between FK506 and L-685,818 is in the addition of a hydroxyl group on the analogue at C-18 and the substitution of an ethyl group for an allyl group at C-21. L-685,818 is of interest for its potential use in the treatment of neurodegenerative diseases, as it enhances functional and morphologic recovery in rats with crushed sciatic nerves.

Various approaches have been developed to provide continuous delivery of biologically active agents such as neuroactive agents, and, although these have overcome some of the problems of delivering the agents, numerous problems remain such as the linearity of release, the biocompatibility of the materials used and the loading capacity.

It would therefore be highly desirable to be provided with polycaprolactone blocks, which would create a larger hydrophobic microreservoir, enabling the incorporation of a greater amount of biologically active agents while preventing damaging effects that such an amount would induce.

SUMMARY OF THE INVENTION

One aim of the present invention is to provide polycaprolactone blocks for obtaining a hydrophobic microreservoir and enabling an amount of lipophilic active agent to be incorporated in a micellar system constructed with such blocks, with a slower release and without the damaging effect that such high doses would induce compared to known delivery systems. Control over the degree of incorporation and the release kinetics may then be gained by varying the length of the polycaprolactone block used in the micellar system.

Another aim of the present invention is to provide a block copolymer micellar system, formed from polycaprolactone-b-polyethylene oxide (PCL-b-PEO) diblocks for delivering a biologically active agent to a specific site.

Polycaprolactone polyethylene oxide blocks are used to form micelles smaller than those of the prior art and more efficient as a drug delivery system for biologically active agents.

In accordance with one aspect of the present invention, there is provided a diblock copolymer compound comprising a hydrophilic block and a hydrophobic block, the hydrophilic block comprising a polyethylene oxide polymer, and the hydrophobic block comprising a polycaprolactone polymer, the polycaprolactone polymer comprising a number of caprolactone monomers selected from 5 to 150, the polyethylene oxide polymer comprising a number of ethylene oxide units monomers selected from 20 to 100.

The number of ethylene oxide monomers may be selected from 20 to 80.

The number of ethylene oxide monomers may be selected from 30 to 60.

The selected number of caprolactone monomers may be 14 and the selected number of ethylene oxide monomers may be 44.

The selected number of caprolactone monomers may be 20 and the selected number of ethylene oxide monomers may be 44.

In accordance with yet another aspect of the present invention, there is provided a diblock copolymer micellar system comprising a plurality of such diblock copolymers, wherein the diblock copolymers are assembled in a suitable aqueous medium such that the hydrophobic blocks define a core of the micellar system and the hydrophilic blocks define a shell surrounding the core.

The micellar system may have a diameter varying essentially from about 10 nanomers to about 100 nanometers.

The micellar system may contain a biologically active agent into the core.

The biologically active agent may be lipophilic.

The biologically active agent may consist of a neuroactive agent.

The neuroactive agent may be selected from the group consisting of FK506 and L-685,818.

The neuroactive agent may consist of L-685,818.

In accordance with yet another aspect of the present invention, there is provided a composition comprising a population of such micellar systems in combination with a suitable carrier.

The copolymers may be present in a solution in an amount selected from about 0.5% to 3% by weight.

In accordance with yet another aspect of the present invention, there is provided a delivery system for delivering a biologically active agent in situ in a patient. The delivery system comprises a plurality of such micellar systems.

The in situ delivery may be effected to the central nervous system of a patient.

In accordance with yet another aspect of the present invention, there is provided a method for preparing such a population of micellar systems. The method comprises dissolving such copolymers in a suitable organic solvent solution and adding water in a dropwise fashion to the solution to form the micellar systems.

The organic solvent solution may be a DMF solution.

The amount of drug incorporated in the micelle and the release kinetics of that drug are largely a function of the interaction between the drug and the core-forming block. Since polycaprolactone is more hydrophobic than other polymers commonly used as core-forming blocks (e.g. polypropylene oxide), this system may have a larger capacity for the most hydrophobic drugs.

The polycaprolactone micellar core is suitable for the incorporation of a variety of biologically active agents including, without limitation, neutral, lipophilic drugs.

Examples of biologically active agents include, without limitation, nonpolar, lipophilic drugs, vitamins, immunosuppressants, immunoactive agents, neutraceuticals, peptidomimetics mimicking growth factors and their antagonists and immunomodulator agents.

The micellar system of the present invention is also suitable to the cosmetic industry such as in the delivery of active agents in creams, toiletries, deodorants, skin and sunscreen preparation. The micellar system of the present invention is also useful in perfumes, by stabilizing the unstable components thereof and by controlling the release kinetics of the fragrance upon application.

The release kinetics of the micelles can be made to vary by changing a range of parameters, including the nature of the copolymer employed, the length of the individual polymer blocks and the morphology and size of the micelles. The morphology and effective diameter of the micelles is controlled by varying specific parameters during micelle preparation.

DETAILED DESCRIPTION OF THE INVENTION

The micellar delivery system of the present invention is able to incorporate much higher concentrations of FK506 that will later be released slowly over time. In this way, it will prevent some of the damaging effects that high doses would induce.

The preliminary results obtained for the PCL-b-PEO micellar system of the present invention reveal it to be a promising drug delivery vehicle for the delivery of various biologically active agents including lipophilic drugs. The small size and indefinite in vitro stability of the micelles render them useful for a wide variety of biomedical applications. Their loading capacity for the very hydrophobic pyrene compound encourages the incorporation of several different compounds with a high degree of hydrophobicity. Studies involving the degree of aggregation encountered in the micelle solutions are now underway with special efforts placed on limiting the degree of aggregation. Also, now that the in vitro biocompatibility of the micelles has been established, it will be assayed in vivo.

In order to establish this system as a suitable drug carrier, a range of the micelle's characteristics including effective diameter, size population distributions, as well as their in vitro stability in various cell culture media has been studied.

The affinity of the micelles for hydrophobic solubilizates was assayed by determining the partition coefficient for the lipophilic compound, pyrene, between the micelles and water; the partition coefficient was found to be of the order of $10^2$.

Though each of the components, PCL and PEO, are biocompatible, the biocompatibility of the block copolymer as a whole was assessed. The in vitro biocompatibility of the copolymer was assayed by incubation of the micelles with PC 12 cells and MCF-7 breast cancer cells as well as primary cultures of human microglia, astrocytes and cortical neurons. The neurotrophic drugs FK506 and L-685,818 were incorporated into the PCL-b-PEO micelles and the in vitro delivery was assayed by monitoring the degree of differentiation achieved in cultures of PC 12 rat pheochromocytoma cells. In both cases the micelle-incorporated drugs, in the presence of nerve growth factor (5 ng/mL), were able to promote the degree of differentiation of the PC 12 rat pheochromocytoma cells.

The block copolymers were synthesized by anionic polymerization. GPC results reveal that the polydispersity (PD) of the block copolymers is 1.16, with a symmetrical mono modal distribution. In all cases, following purification of the block copolymer, there was no homopolymer present. The PCL-b-PEO copolymers employed have identical PEO oxide block lengths (44 ethylene oxide units) but different PCL block lengths; 14 or 20 units. These polymers are designated as $PCL_{14}$-b-$PEO_{44}$ and $PCL_{20}$-b-$PEO_{44}$ respectively.

The PCL-b-PEO micelles cannot be prepared in water alone due to the hydrophobicity of the polycaprolactone core-forming block. For this reason, the block copolymer is first dissolved in a suitable organic solvent solution such as DMF, and micellization is induced by the dropwise addition of water, followed by dialysis. The micelles formed by this method of preparation were studied by dynamic light scattering in order to measure their effective diameter and their population distribution in terms of size.

The Dynamic Light Scattering instrument was used to measure the effective diameter of the micelles and Contin Analysis was employed to determine the population distribution of the micelles in terms of their size. The effective diameter of 0.1% (w/w) solutions of the micelles when a 0.45 um filter is used is 62 nm for the $PCL_{20}$-b-$PEO_{44}$ and 55 nm for the $PCL_{14}$-b-$PEO_{44}$.

Figure 1:
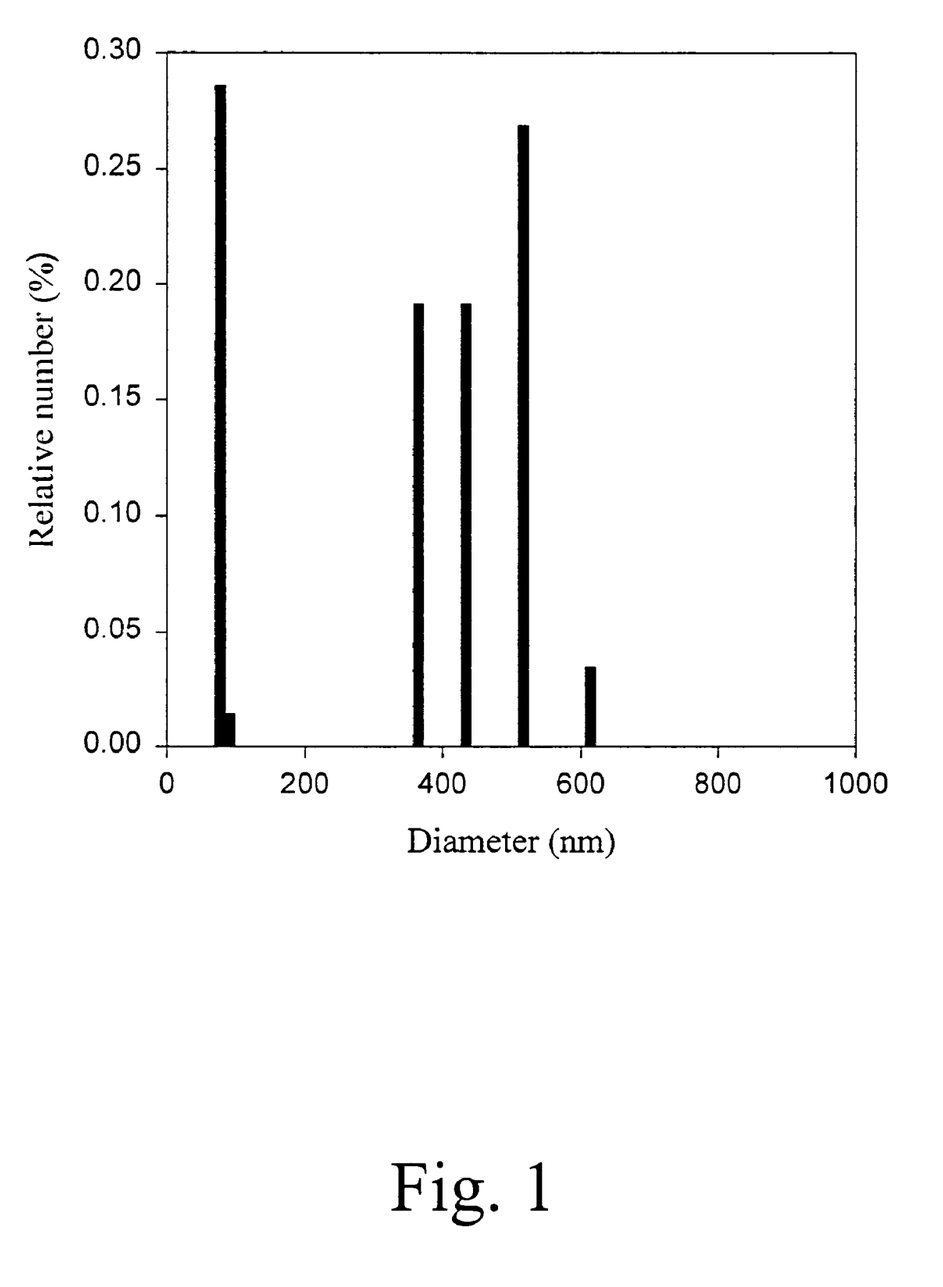
FIG. 1 illustrates the particle size distribution of a 0.02% (w/w) solution of the $PCL_{20}$-b-$PEO_{44}$ copolymer micelles.
Figure 2:
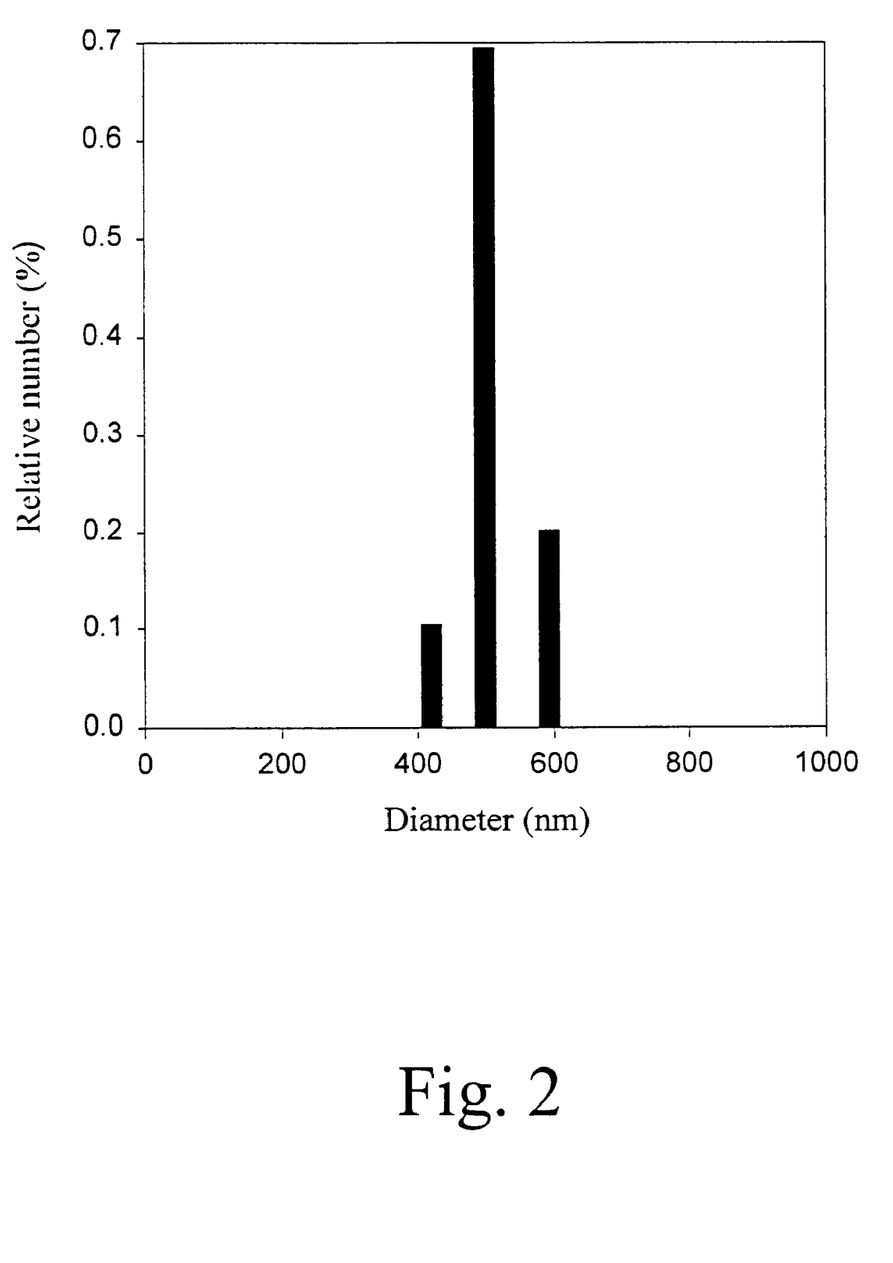
FIG. 2 illustrates the particle size distribution of a 0.1% (w/w) solution of the $PCL_{20}$-b-$PEO_{44}$ copolymer micelles.

FIGS. 1 and 2 show the population distribution of the micelles calculated by Contin analysis of the dynamic light scattering measurements, obtained for unfiltered solutions of the $PCL_{20}$-b-$PEO_{44}$ micelles (0.02% and 0.1% w/w, respectively).

FIG. 1 shows the bimodal population distribution found in a 0.02% (w/w) of $PCL_{20}$-b-$PEO_{44}$. The larger population, at approximately 500 nm, consists of aggregates of the small individual micelles, which are seen at approximately 50 nm. FIG. 2 shows the population distribution in terms of size of a 0.1% (w/w) (unfiltered micelle solution) of $PCL_{20}$-b-$PEO_{44}$.

The effect of dilution, following the preparation, on this bimodal population distribution was examined as the concentration was varied from 0.01% to 0.2% (w/w). In all cases, the 500 nm population was most prevalent at the higher concentration range, while dilution resulted in a gradual shift in favor of the 50 nm population. Comparing FIGS. 1 and 2, it may we seen that as the solution is diluted, decreasing the concentration from 0.1% to 0.02%, the population of the larger aggregates is decreased in favor of the smaller (50 nm) population. This suggests that the larger aggregates are composed of aggregates of small individual micelles. Micelles with a coronal shell formed from PEO are frequently seen to form larger aggregates in solution. The large associates of PS-b-PEO were suggested to be either onion-like aggregates or aggregates of small individual micelles, confirmed with large associates observed with PEO-b-PBLA micelles (La S. B. et al. (1996) *Journal of Pharmaceutical Sciences*, 85:85–90). The aggregates of individual micelles may form due to either hydrophobic-hydrophobic interactions or Van der Waals interactions between the exposed cores of the individual micelles.

A PEO block of 44 units in length was chosen since this has most commonly been the length of the PEO stabilizing moieties employed for the steric stabilization of liposomes. However, most likely the length of the PEO blocks are too short to outweigh the hydrophobic-hydrophobic or Van der Waals interactions between the exposed polycaprolactone cores. The relationship between the PEO chain length and the degree of aggregation achieved in the micelle solution is now being studied.

Dynamic light scattering measurements were also used to monitor the in vitro stability of the micelles in water and the cell culture media DMEM and RPMI. Over a three-month period, the micelles were still intact and the population distribution of the micelles in terms of size remained relatively constant. These studies are still ongoing since the in vitro stability of the micelles will determine the extent to which they are suitable for various applications.

The degree of non-covalent incorporation of physical entrapment of a hydrophobic drug into a micelle is determined by the partition coefficient of the drug between the micellar core and the surrounding aqueous medium. The affinity of the PCL-b-PEO micelles for lipophilic compounds was assayed by the determination of the $K_v$ for the hydrophobic model compound, pyrene, between the PCL-b-PEO micelles and water. This method has been previously used to determine the $K_v$ of pyrene between polystyrene-b-polyacrylic acid micelles and water. This fluorescence method is based on pyrene's sensitivity to the hydrophobicity of its microenvironment. This is reflected in changes in the ratio of the $I_3/I_1$ bands of its emission spectrum. The method requires the measurement of the $I_3/I_1$ ratio for pyrene in micelle solutions of various $DMF/H_2O$ solvent mixtures.

Figure 3:
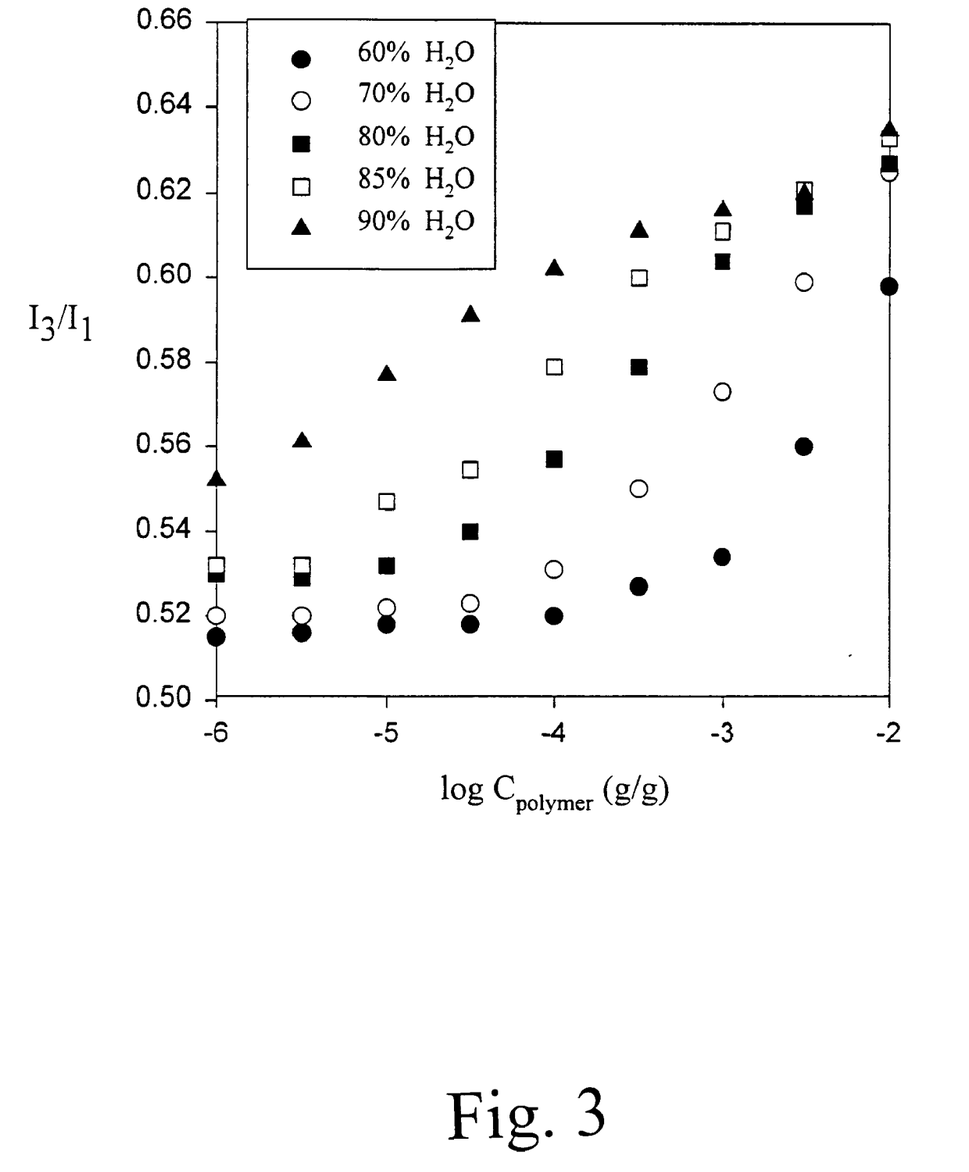
FIG. 3 illustrates the $I_3/I_1$ ratio for pyrene in a solution of $PCL_{14}$-b-$PEO_{44}$ copolymer micelles and a $DMF/H_2O$ solvent mixture.

FIG. 3 shows the $I_3/I_1$ ratio of pyrene in micelle solutions of different PCL-b-PEO copolymer concentrations over a range of water contents in the $DMF/H_2O$ solvent mixtures. The increase in the water content within the solvent mixture provides a driving force promoting the entry of pyrene into the more hydrophobic environment of the polycaprolactone micelle core. The $I_3/I_1$ ratio for pyrene in the many solutions was then used to calculate the partition coefficient for pyrene in each solution. The $I_3/I_1$ ratio shown in FIG. 3 increases with increasing water content within the solvent mixture for a constant copolymer concentration. Likewise for a particular water content within the solvent mixture, the $I_3/I_1$ ratio increases as the copolymer concentration is increased.

Figure 4:
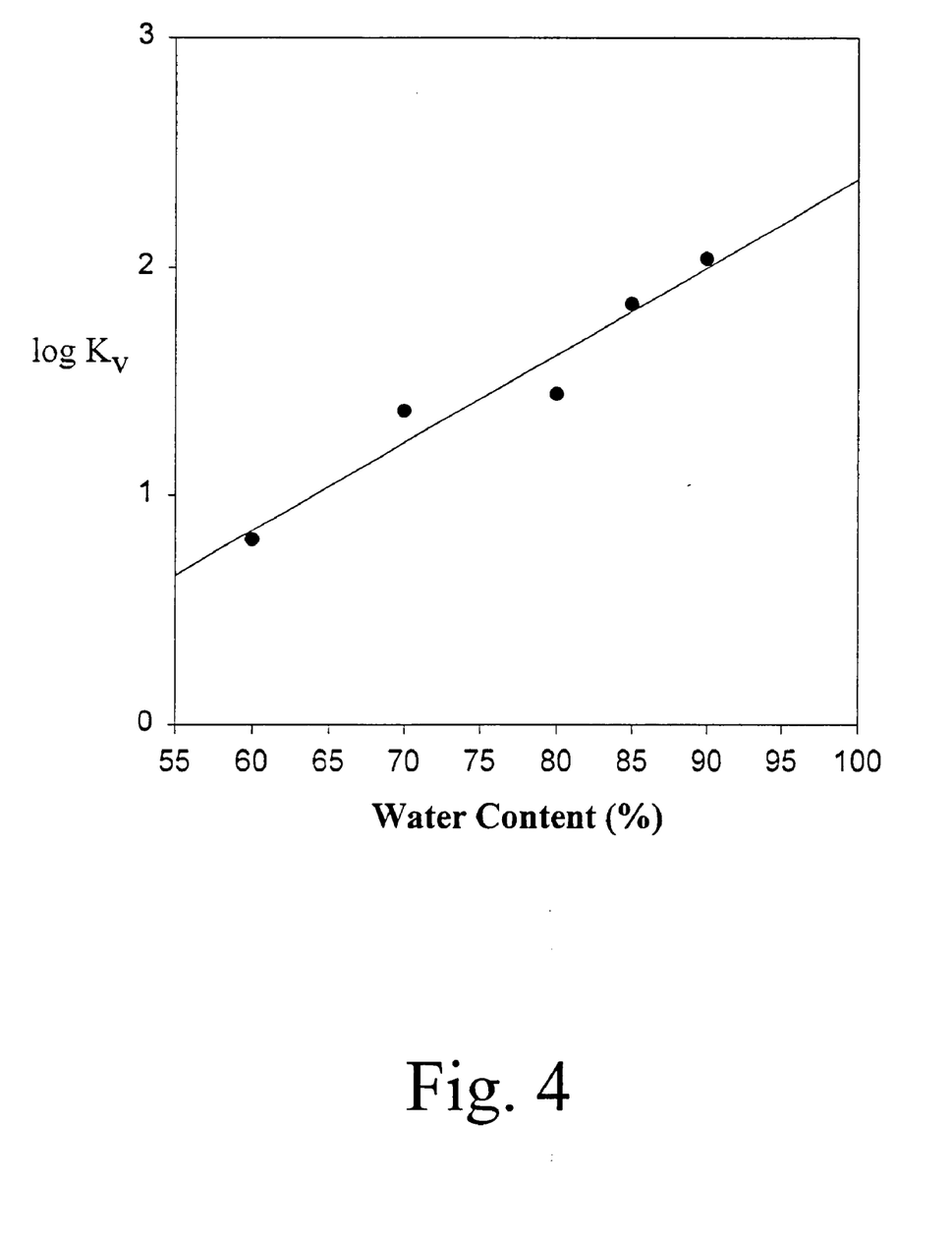
FIG. 4 illustrates the semilogarithmic plot of the partition coefficient for pyrene in a solution of the PCL-b-PEO micelles and a range of $H_2O/DMF$ solvent mixture.

FIG. 4 shows the partition coefficients calculated for pyrene between the PCL-b-PEO micelles and the $DMF/H_2O$ solvent mixtures. The extrapolation of this plot to 100% water content gives a value of $K_v$ of the order of $10^2$ for the partition coefficient for pyrene between the PCL-b-PEO (20-b-44) micelles and $H_2O$, which is low in comparison to a partition coefficient of the order of $10^5$ found for pyrene between the polystyrene-b-polyacrylic acid (PS-b-PAA) micelles and water (Zhao, J. et al. (1997) *Macromolecules*, 30:7143–7150). The high value for the $K_v$ of pyrene between the PS-b-PAA micelles and water is thus due to the highly hydrophobic nature of both pyrene and the polystyrene core. The PCL core, though hydrophobic, is clearly less hydrophobic than polystyrene. However, this value of $K_v$ for pyrene between the PCL-b-PEO micelles and water is of the same order of magnitude as that for pyrene in a solution of $PEO_{m/2}$-b-$PPO_n$-b-$PEO_{m/2}$ (m=51, n=38) and water at the same temperature (20° C.).

The greatest degree of solubilization of a compound within a micelle core is achieved when there is a close match between the degree of the polarity and hydrophobicity of the compound and the micelle core. For this reason, the incorporation of various hydrophobic drugs into micelles with a longer polycaprolactone core forming block is being explored. Overall, the incorporation of the highly hydrophobic compound, pyrene, reveals the suitability of this micelle system as a potential carrier for even the most lipophilic compounds.

The incubation of the micelles with several different cell lines and primary cultures was employed as a means of testing the biocompatibility of the PCL-b-PEO micelles. Primary cultures of human microglia, astrocytes and cortical neurons were incubated with micelles formed from $PCL_{14}$-b-$PEO_{44}$ and $PCL_{20}$-b-$PEO_{44}$. In the cell cultures tested, the $PCL_{14}$-b-$PEO_{44}$ induced 10–20% cell death whereas the micelles formed from $PCL_{20}$-b-$PEO_{44}$ did not cause any noticeable damage. For the incubation of the micelles with the PC 12 and MCF-7 cells, the results from the Trypan blue and Alamar blue survival assays found the micelles to cause little or no cell death when compared with the control wells of untreated cells.

The in vitro biocompatibility of the PCL-b-PEO micelles (14-b-44, 20-b-44) was tested by incubating the micelles with a wide range of cell lines for both 24-hour and 48-hour periods. The Trypan blue and Alamar blue survival assays were then used to quantify the survival rates in the presence of the PCL-b-PEO micelles. The capability of the PCL-b-PEO micelle system to deliver a hydrophobic compound was first tested in vitro using pyrene as a model compound. The pyrene incorporated PCL-b-PEO micelles were incubated with PC 12 cells over a 24-hour period. At 0, 4, 8 and 24 hours, samples of the supernatant were studied by fluorescence in order to determine the quantity of pyrene remaining in the supernatant at each time point. Likewise, at each time point, cells were isolated and their fluorescence was examined under the fluorescence microscope in order to determine if the decrease in the fluorescence within the supernatant was accompanied by an increase in fluorescence within the cells.

Figure 5:
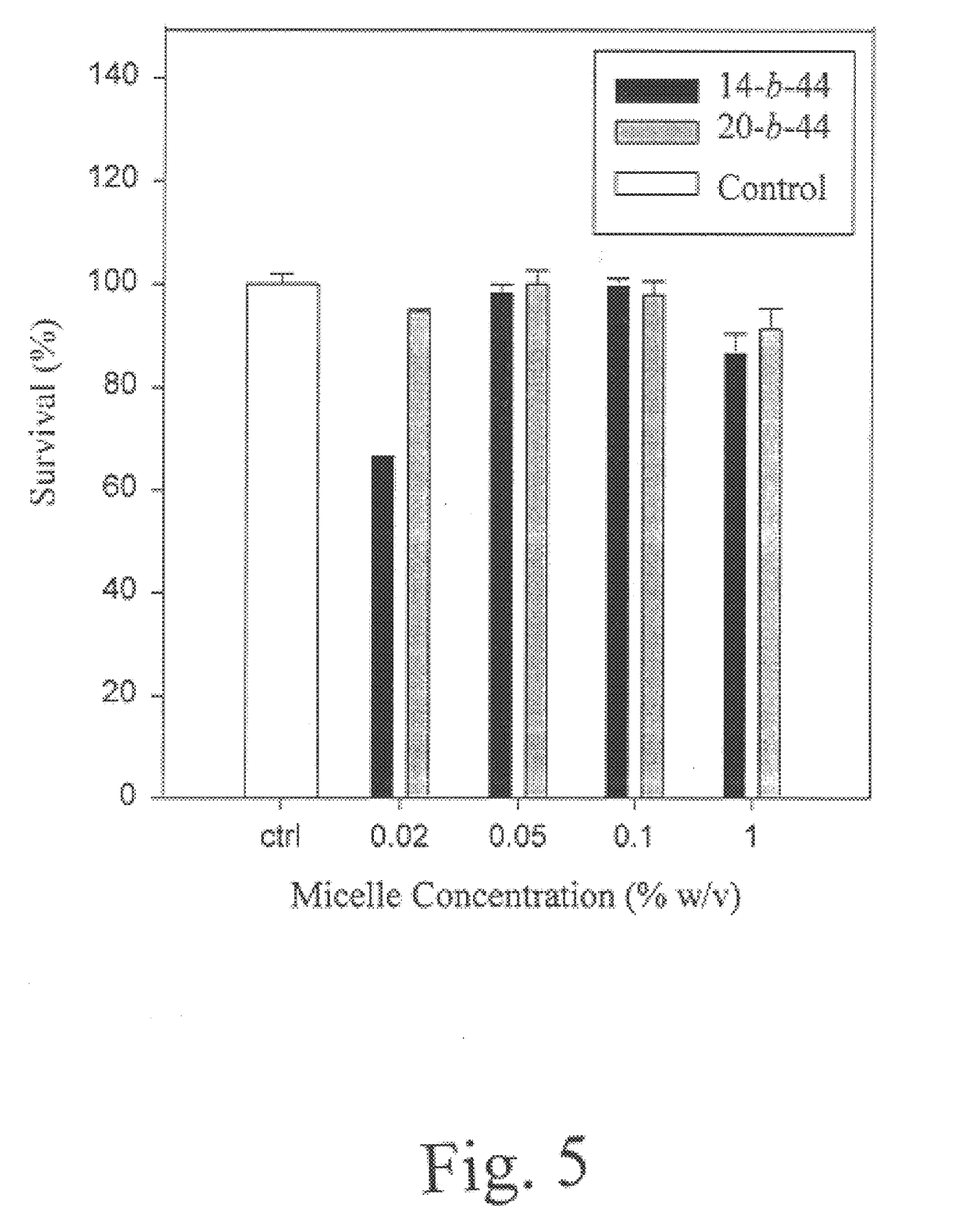
FIG. 5 illustrates the in vitro biocompatibility of the PCL-b-PEO (14-b-44 and 20-b-44) micelles (0.02–1% w/v) as determined by the Alamar Blue survival assay. The results were confirmed by the Trypan Blue assay. Each data point represents the average of 3 independent experiments, from 6–8 wells.

FIG. 5 shows the results of the Alamar blue assay for the incubation of the PCL-b-PEO micelles with PC 12 cells over a 48-hour period. At almost every concentration, the micelles formed from the $PCL_{14}$-b-$PEO_{44}$ block copolymer appeared to have a slightly lower cell survival than the 20-b-44 micelles. The survival rate obtained for the incubation of the PCL-b-PEO micelles (0.02–1% (w/v)) with PC 12 cells over a 24-hour period was between 85% and 100%, except for the 70% survival rate obtained for the incubation of the $PCL_{14}$-b-$PEO_{44}$ micelles at the lowest concentration. As may be seen in FIG. 5, at several concentrations, the survival rate obtained with the $PCL_{14}$-b-$PEO_{44}$ is slightly lower than that obtained with the $PCL_{20}$-b-$PEO_{44}$. For this reason the 20-b-44 PCL-b-PEO system, rather than the 14-b-44 system, is investigated as the delivery system for FK506 and L-685,818.

The in vitro biocompatibility studies have shown that addition of a $PCL_{20}$-b-$PEO_{44}$ micelle solution to the cell well causes little or no cell death. However, the actual destination of the micelles following their addition to the cell well is still unknown. There are several possibilities; they all remain in the supernatant, they all enter the cell, possibly only the small micelles can enter the cell while the larger aggregates remain in the supernatant, or the micelles may aggregate at the cell surface. The destination of the micelles is currently being investigated since this will largely affect the types of drugs that will most effectively be delivered by this system. The cell uptake studies reveal that the addition of pyrene-incorporated micelles to the cells does, in fact, result in the accumulation of pyrene within the cells. It is however unknown whether or not the micelles have simply remained in the supernatant or have somehow facilitated the entry of pyrene into the cells. Since the partition coefficient for pyrene between water and the PCL-b-PEO micelle system is of the order of $10^2$, it seems likely that the micelles either enter the cells themselves or possibly attach themselves to the surface of the cell, enabling the drug to enter the cell without having to enter the hydrophilic cell medium.

Figure 6:
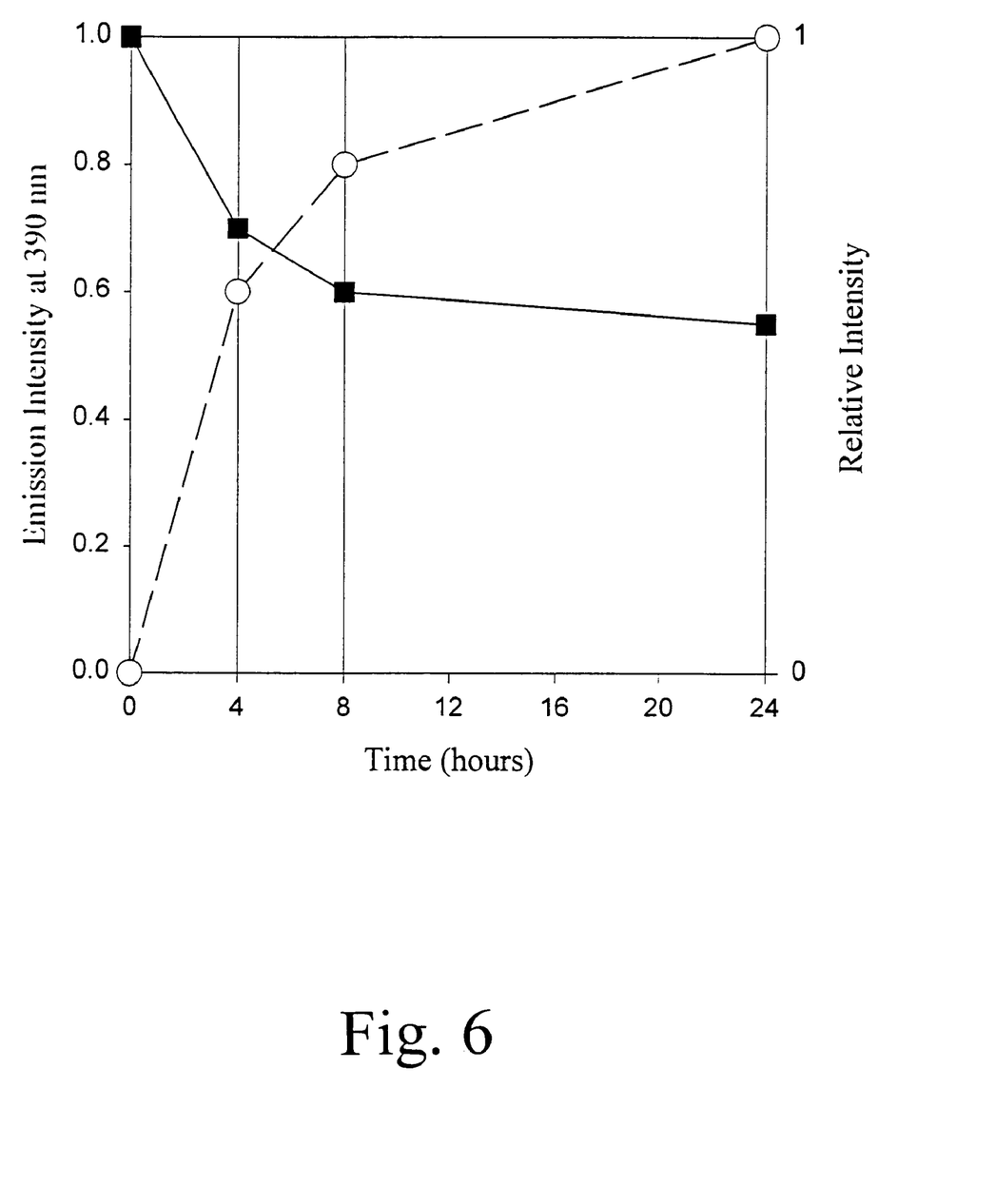
FIG. 6 illustrates the change in the relative emission intensity of pyrene in the supernatant (■) and cells (○) at 390 nm over a 24-hour period. PC 12 cells were exposed to $PCL_{14}$-b-$PEO_{44}$ micelles containing pyrene and the change in the fluorescence intensity was measured at 4, 8 and 24-hour time points.

FIG. 6 shows the fluorescence intensity found for both the supernatant at 390 nm and the cells at the 0, 4, 8 and 24-hour time points. The fluorescence intensity of pyrene in the various aliquots of supernatant was found to decrease over the 24-hour incubation period indicating a decrease in the amount of pyrene remaining in the external medium. The relative fluorescence intensity at zero time was taken as 1 while after 4 hours it had decreased to 0.70 (±0.05) after 8 hours 0.60 (±0.05), and finally after 24 hours the intensity was 0.55 (±0.05), as shown in FIG. 6. The cells were isolated at each time point and analyzed by fluorescence microscopy. The contrast relative to the intensity of fluorescence in the cells increased over the 24-hour period, from non-detectable at time zero to the maximum (arbitrarily set at 1) after 24 hours. FIG. 6 shows a pronounced decrease in the fluorescence of the supernatant at the 4-hour time point. This decrease was found to be more gradual over the rest of the 24-hour period. A similar trend was also seen for the fluorescence of the isolated cells where the fluorescence increases gradually over the 24-hour period. At the 24-hour time point, the fluorescence is quite intense and appears to be localized in small spherical aggregates.

The size of the PCL-b-PEO micelles as well as their in vitro stability, in vitro biocompatibility and loading capacity for lipophilic compounds such as pyrene was further studied for this system as a delivery system for hydrophobic drugs. FK506 and L-685,818 were selected as hydrophobic candidate drugs to be delivered by the PCL-b-PEO micellar system.

In each case, the degree of neurite-like outgrowth was taken to be 100% in the control wells of untreated PC 12 cells. The degree of differentiation in cell wells in the presence of NGF and/or drug is expressed as a percentage relative to 100% for the control.

As mentioned above, FK506 and L-685,818 both potentiate the effect of NGF on the outgrowth of PC 12 cells. In order to compare the effect of the micelle-incorporated FK506 and L-685,818 with the free drugs, dose-response curves were constructed for NGF, FK506, L-685,818 alone as well as the combinations of NGF with FK506 or L-685, 818.

Figure 7:
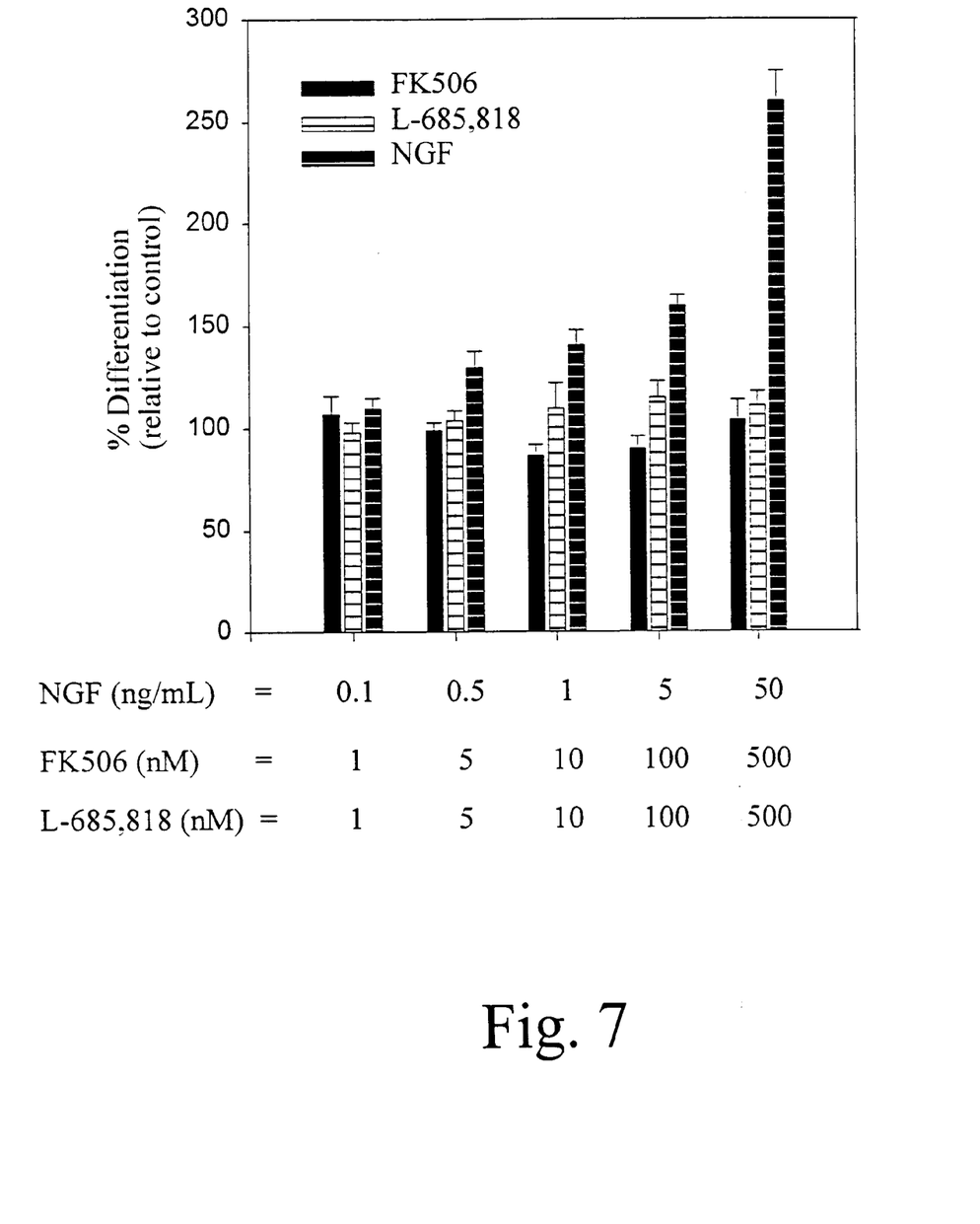
FIG. 7 illustrates the degree of neurite-like outgrowth in PC 12 cells incubated with either NGF, FK506 or L-685,818 over a 48-hour period (n=3–4). The concentration of NGF incubated with the cells was C1=0.1, C2=0.5, C3=1, C4=5, C5=50 ng/mL, the concentrations of FK506 or L-685,818 was C1=1, C2=5, C3=10, C4=100, C5=500 nM. The degree of differentiation in the control (absence of any treatment) is taken to be 100%.

FIG. 7 shows the degree of neurite-like outgrowth obtained over 48-hour incubation of PC 12 cells with either NGF, FK506 or L-685,818. The degree of outgrowth in the wells where NGF had been added was found to increase from 110–260% as the concentration of NGF incubated with the cells increased. In wells incubated with FK506 or L-685,818 alone, the degree of outgrowth did not vary with the concentration of drug added, rather it oscillated slightly around the 100% value. The dose-response curves for each of NGF, FK506 and L-685,818 alone show that the degree of differentiation of the PC 12 cells increases with increasing concentrations of NGF. However, the concentration of either FK506 or L-685,818 alone was found to have no effect on the degree of differentiation.

As may be seen in FIGS. 6–7, the ability of both FK506 and L-685,818 to potentiate the effect of NGF on neuronal outgrowth was thus retained despite their incorporation into the PCL-b-PEO copolymer micelles (bars 7–9). The degree of neurite-like outgrowth achieved in cell cultures treated with 5 ng/mL NGF and either micelle-incorporated FK506 or L-685,818 was in both cases less than that obtained when the cells were treated with 5 ng/mL NGF and free FK506 or L-685,818, as shown with bars 4–6. This may be due to the limited 48-hour incubation period over which time only a fraction of the drug will be released from the micelles. It should be noted that, in vitro, a dose of FK506 as low as 1 nM is adequate to potentiate neurite-like outgrowth in PC12 cell cultures, as shown in FIG. 6. It was also found in several in vivo studies on rats that 1 mg/kg of FK506 was an effective dose (Butcher S. P. et al. (1997) *J. Neurosci.*, 17:6939–6946).

Figure 8:
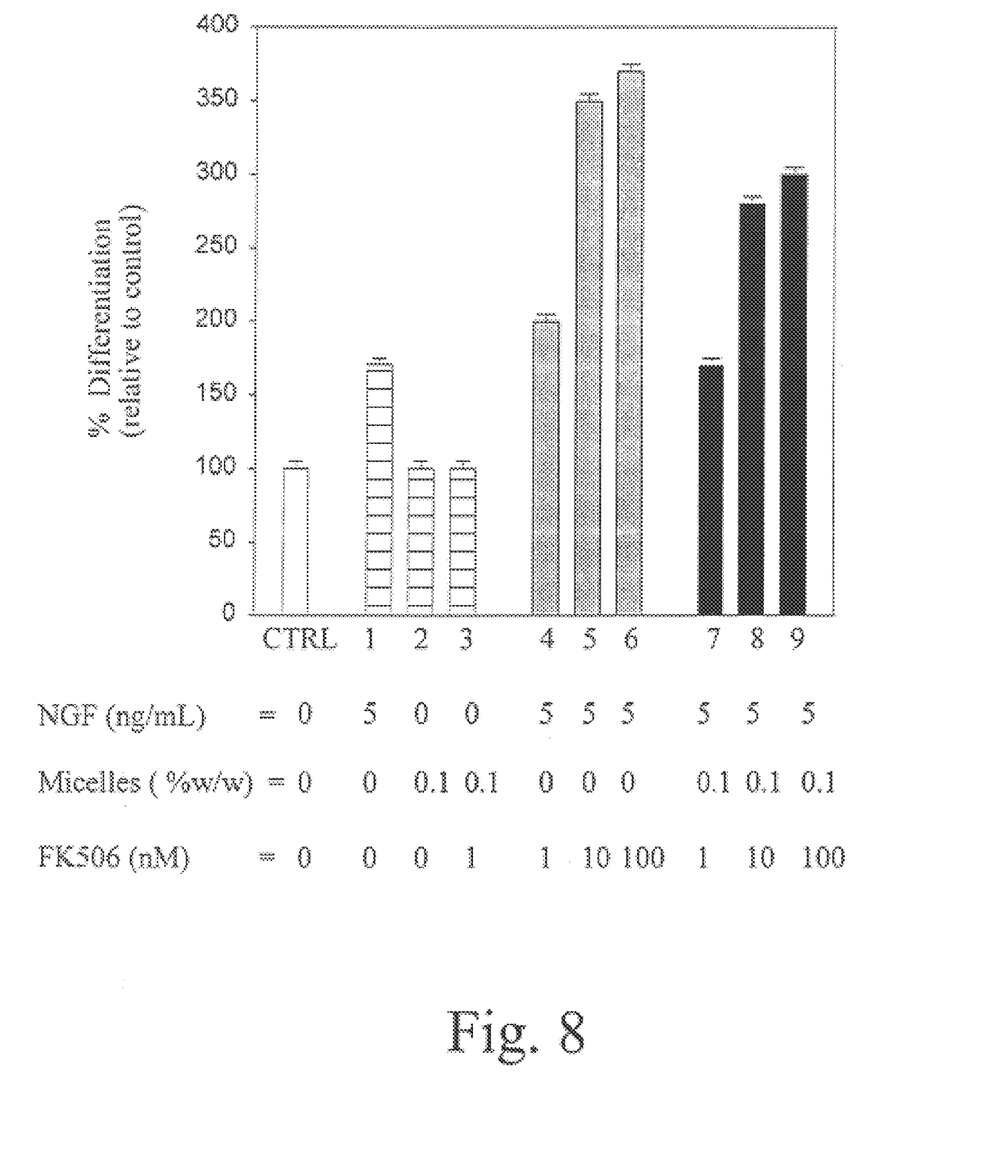
FIG. 8 illustrates the effect of micelle-incorporated FK506 and NGF (5 ng/mL) on the neurite-like outgrowth in PC 12 cells over a 48-hour period (n=3–4). Control=PC 12 cells in the absence of any treatment. Bars 1–9 are PC 12 cells treated with the following: Bar 1=5 ng/mL NGF, Bar 2=$PCL_{20}$-b-$PEO_{44}$ micelles, Bar 3=micelle-incorporated FK506 (1 nM), Bars 4–6=FK506 (Bars 4,5,6=1, 10, 100 nM respectively) along with 5/ng/mL NGF; Bars 7–9=micelle-incorporated FK506 (Bars 7,8,9=1, 10, 100 nM respectively) along with 5 ng/mL NGF.

FIG. 8 shows the degree of differentiation in PC 12 cells which have been incubated with PCL-b-PEO incorporated FK506 and 5 ng/mL NGF following a 48-hour incubation period. The degree of neurite-like outgrowth in cells incubated with 5 ng/mL of NGF was 160±5%. In cell wells incubated with micelle-incorporated FK506 (1 to 100 nM) along with 5 ng/mL of NGF the neurite-like outgrowth ranged from 170–300%. The neurite-like outgrowth for cells incubated with 5 ng/mL of NGF was found to be 180±6%. As shown in FIG. 8, the degree of outgrowth in cells incubated with NGF (5 ng/mL) along with FK506 (1–100 nM) increased from 220–380% with increasing concentration of FK506. FIG. 8 shows no significant difference between untreated cells and cells treated with either PCL-b-PEO micelles without drug or cells treated with micelle-incorporated FK506 (control vs. bar 2 and 3). There was also no significant difference between cells treated with 5 ng/mL NGF and those treated with micelle-incorporated FK506 (1 nM) along with 5 ng/mL NGF (bar 1 vs. bar 7). However, there was a significant difference (p<0.01) between cells treated with 5 ng/mL NGF and cells treated with 10 or 100 nM of micelle-incorporated FK506 (bar 1 vs. bars 8 and 9).

Figure 9:
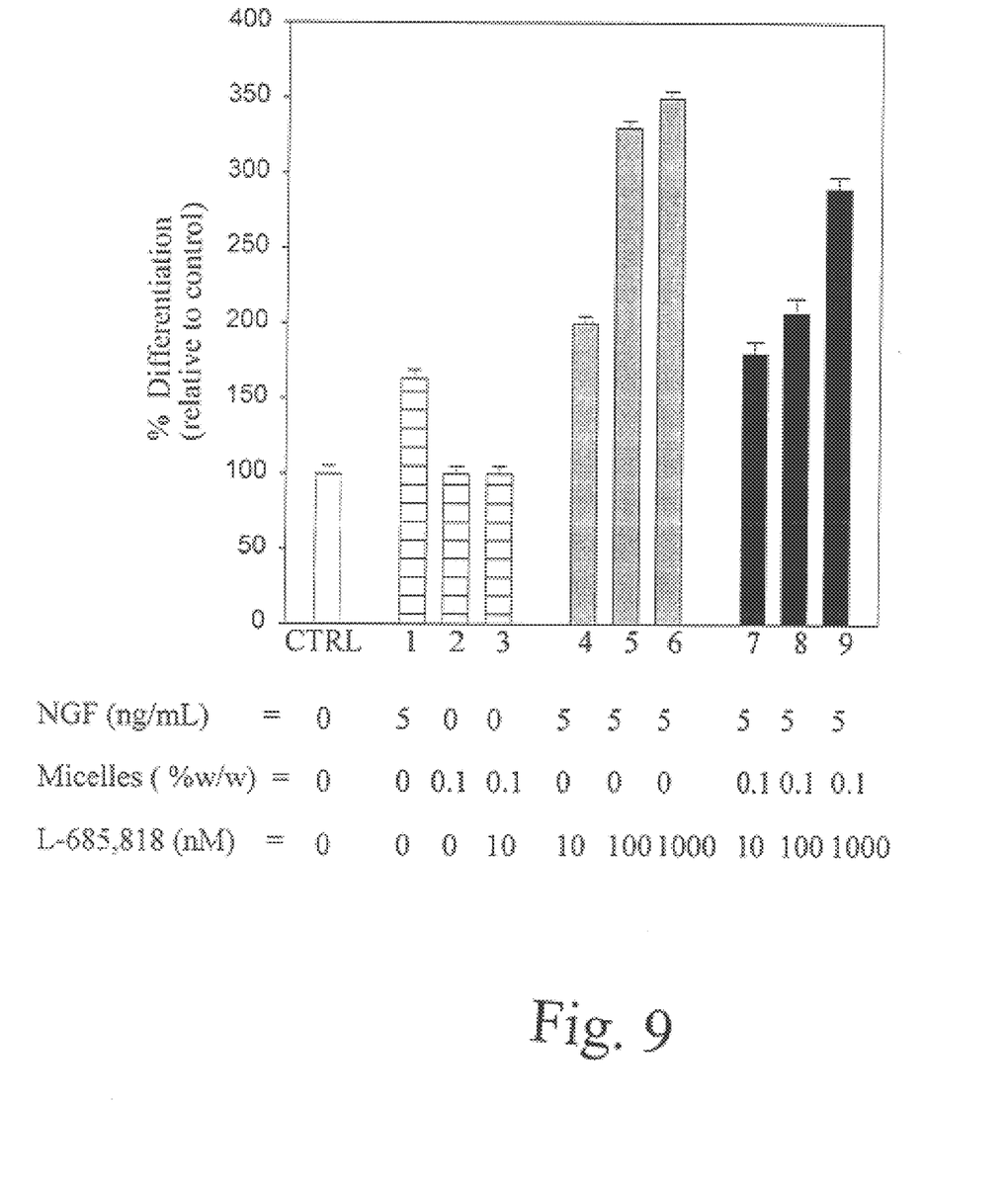
FIG. 9 illustrates the effect of micelle-incorporated L-685,818 and NGF (5 ng/mL) on the neurite-like outgrowth in PC 12 cells over a 48-hour period (n=3–4). Control=PC 12 cells in the absence of any treatment. Bars 1–9 are PC 12 cells treated with the following: Bar 1=5 ng/mL NGF, Bar 2=$PCL_{20}$-b-$PEO_{44}$ micelles, Bar 3=micelle-incorporated L-985,818 (10 nM), Bars 4–6=L-985,818 (Bars 4, 5, 6=10, 100, 1000 nM respectively) along with 5 ng/mL NGF; Bars 7–9=micelle-incorporated L-985,818 (bars 7, 8, 9=10, 100, 1000 nM respectively) along with 5 ng/mL NGF.

FIG. 9 shows the degree of differentiation in PC 12 cells which have been incubated with PCL-b-PEO incorporated L-685,818 and 5 ng/mL NGF following a 48-hour incubation period. The degree of differentiation seen in cells incubated with the micelle incorporated L-685,818 along with 5 ng/mL NGF increased from 163–290% as the concentration of drug increased from 10 nM to 1 $\mu$M. As may be seen in FIG. 9, there is no significant difference between the untreated cells and the cells treated with micelles alone or 10 nM of micelle incorporated L-685,818 (control vs. bar 2 or bar 3). Also, no significant difference was found between cells treated with 5 ng/mL of NGF and 10 nM micelle incorporated L-685,818. There was a significant difference (p<0.01) between cells treated with 5 ng/mL NGF and cells treated with 100 nM and 1 $\mu$M of micelle incorporated L-685,818 (bar 1 vs. bars 8 and 9).

The PCL-b-PEO-incorporated FK506 and L-685,818 were both found to potentiate the effect of NGF on neurite-like outgrowth in PC 12 cell cultures.

The present invention will be more readily understood by referring to the following examples which are given to illustrate the invention rather than to limit its scope. In the following examples, the chemicals for the synthesis were purchased from Aldrich Chemical Co. FK506 (Prograf™) was purchased from Fujisawa Pharmaceutical, Osaka, Japan. L-685 818 was supplied by Merck Inc.

The MCF-7 cells and primary cultures of human microglia, astrocytes and cortical neurons were supplied by Dr. Antel at the Montreal Neurological Institute. The tissue culture reagents were all purchased from Gibco BRL. The Alamar blue was purchased from Biosource Camarillo and the Trypan blue from Gibco BRL.

EXAMPLE I

Characterization of the PCL-b-PEO Micelles

Micelle Preparation

The PCL-b-PEO copolymer was dissolved in DMF and stirred overnight at room temperature. Micellization was achieved by the addition of water in a dropwise fashion to the block copolymer solution to form a micelle solution. The micelle solution was stirred overnight and then dialyzed against milli Q distilled water using dialysis tubing. The water was changed every hour for the first four hours and then every three hours for the next twelve hours.

Micelle Size Distribution

Dynamic laser light scattering (DLS) measurements on the PCL-b-PEO block copolymer micelles were carried out using a Brookhaven laser light scattering instrument (Brookhaven Instruments Corporation, New York, U.S.A.), with a uniphase 125 mW micro green laser at a wavelength of 532 nm at 25° C. A scattering angle of 90° was used for all measurements. The concentration of the samples ranged from 0.01 to 0.2% w/w in filtered (0.8 um filter) deionized distilled Milli Q water.

In vitro Micelle Stability Studies

The 1% w/w PCL-b-PEO block copolymer micelle solutions prepared as described above were freeze dried and dissolved in Dulbecco's Modified Eagle Medium (DMEM, Gibco), RPMI medium and water to produce both 0.01% and 0.1% w/w solutions. Dynamic laser light scattering (DLS) measurements on the solutions were carried out on a weekly basis over a 3 month period.

EXAMPLE II

Determination of the Partition Coefficient for Pyrene Between the PCL-b-PEO Block Copolymer Micelles and a DMF/H2O Solvent Mixture The fluorescence method used to determine the partition coefficient for pyrene between a mixed water/DMF solvent mixture (60–90% water content) and block copolymer micelles (concentration $PCL_{20}$-b-$PEO_{44}$ ranges from $1\times10^{-6}$ to $1\times10^{-2}$ g/g), at 25° C., has been described in detail elsewhere (Zhao, J. et al. (1997) *Macromolecules*, 30:7143–7150). The incorporation of pyrene into the micelle core has been described as a partition equilibrium between a micellar phase and a solvent phase. Briefly, the intensity ratio of vibrational band three to vibrational band one ($I_3/I_1$) in the fluorescence emission spectrum of pyrene reflects the polarity of the surrounding environment of the probe molecules. The $I_3/I_1$ ratio can thus be used to calculate the concentration of pyrene incorporated into the micelles and from this concentration as well as the total amount of pyrene in solution the partition coefficient ($K_v$) for pyrene can be calculated between the PCL-b-PEO micelles and the $H_2O$/DMF solvent mixtures. The semilogarithmic plot of the $K_v$ versus the water content can then be extrapolated to 100% water content.

Preparation of Solutions for the Determination of the Partition Coefficient

Sample solutions were prepared by adding known amounts of pyrene in acetone to each of a series of empty vials, following which the acetone was evaporated. The amount of pyrene was chosen so as to give a pyrene concentration in the final solution of $1.5\times10^{-9}$ mol/g. Different amounts of $PCL_{14}$-b-$PEO_{44}$ copolymer in DMF were then added. The initial volumes of the solutions were ca. 2 mL. Micellization of the polymer was achieved by adding water at a rate of 1 drop every 10 s. The addition of water was continued until the desired water content was reached. All the sample solutions were stirred overnight before fluorescence measurements were taken.

Fluorescence Measurements

Steady-state fluorescent spectra were measured using a SPEX Fluorolog 2 spectrometer in the right-angle geometry (90° collecting optics). For the fluorescence measurements ca. 3 mL of solution was placed in a 1.0-cm square quartz cell. All spectra were run on air-equilibrated solutions. For fluorescence emission spectra, $\lambda_{ex}$ was 339 nm. Spectra were accumulated with an integration time of 1 s/0.5 nm.

EXAMPLE III

Studies Involving the PCL-b-PEO Micelles and PC 12 Cells

Cell Cultures

PC 12 cells were maintained in DMEM supplemented with 10% horse serum, 5% fetal calf serum, 500 $\mu$g/mL penicillin, 500 $\mu$g/mL streptomycin and 290 $\mu$g/mL.

In vitro Biocompatibility of the PCL-b-PEO Micelles

PC 12 cells and the MCF-7 breast cancer cells were maintained at 37° C. in 5% $CO_2$. The cells were plated in 96 well plates and cultured in RPMI medium supplemented with 5% fetal bovine serum. Aliquots of the 10% and 1% PCL-b-PEO micelle solutions ($PCL_{14}$-b-$PEO_{44}$ and $PCL_{20}$-b-$PEO_{44}$) were added to the wells to make the final concentration of micelles in the wells to range from 0.02% to 1% (w/v). In each case, there were controls which consisted of cells without any micelles added to the wells. The cells were incubated with the micelles for both a 24 and 48 hour period, at which point the Trypan blue and Alamar blue survival assays were employed to assess cell viability in the presence of the PCL-b-PEO micelles.

Cell Survival Assays (i) Trypan Blue Exclusion Assay

Following the 24 or 48 hour incubation period, the cells were detached with 0.025% Trypsin. The cell suspension was mixed with 75 $\mu$L of PBS and 25 $\mu$L of Trypan blue. The number of viable cells was determined by using a light microscope (Nikon, objective 20X). The percentage of viable cells was expressed as the number of viable cells divided by the total number of cells.

(ii) Alamar Blue Assay

A 10 $\mu$L aliquot of the Alamar blue was added to each cell well following a 24 hour or 48 hour incubation period. Following incubation with the dye, 50 $\mu$L of the contents of each well was then transferred to a new 96 well plate and the absorbance at 570 nm was measured by a microplate reader (Biorad, Mode 550). Cell viability was expressed as the inverse of the absorbance. The value obtained for the controls was considered to be 100% survival.

Cell Uptake of Pyrene Incorporated Micelles

Pyrene incorporated micelles were prepared such that a total of $2\times10^{-7}$ moles/L of pyrene had been added to the 1% (w/w) micelle ($PCL_{14}$-b-$PEO_{44}$) solution, An aliquot of the micelle solution was incubated with PC 12 cells cultured in DMEM at 37° C., 5% $CO_2$. At time 0, and 4, 8 and 24 hours, the fluorescence intensity (Perkin Elmer LS 50) of the supernatant was measured at 390 nm to determine the amount of pyrene remaining in the supernatant. Controls consisting of medium or medium and micelles alone were also measured. Following the removal of the aliquot of supernatant at each time point, the remaining supernatant was removed and the cells were washed three times with 100 uL of phosphate buffer saline. The cells were then gently scraped and fixed with aquamount on a slide and analyzed using a fluorescence microscope (Olympus BH-2).

EXAMPLE IV

Effect of FK 506- and L-685,818-incorporated PCL-b-PEO Micelles

Preparation of the FK506 and L-685,818 Incorporated PCL-b-PEO Micelles

Stock solutions of each drug were prepared by dissolving the drug in acetone. An aliquot of the stock solution was then added to an empty sample vial, the acetone was evaporated and preparation proceeded as described above. The FK506 drug was received as a sterile solution (Prograf™, Fujisawa Pharmaceutical, Osaka, Japan) and thus it had to be isolated prior to use. The drug was then dissolved in acetone to produce a $5.6\times10^{-4}$ moles/L stock solution. An aliquot of the stock solution was added to an empty sample vial and the acetone was evaporated off. The $PCL_{20}$-b-$PEO_{44}$ block copolymer was added to the vial along with DMF, then water was added dropwise and the solution was dialyzed (as described above) to produce a $1.1\times10^{-5}$ moles/L concentration of drug in a 1% (w/w) block copolymer solution. For the L-685,818 analogue the concentration of the stock solution was $5.6\times10^{-4}$ moles/L. The L-685,818 micelle-incorporated solution was produced in the same manner but the final concentration of the analogue was $2.3\times10^{-5}$ moles/L in the 1% (w/w) $PCL_{20}$-b-$PEO_{44}$ micelle solution. For both the FK506 and L-685,818 micelle solutions, the concentration mentioned is the maximum quantity of drug incorporated into the micelles; some will be lost in the dialysis process.

In vitro Studies of Free form FK506 and L-685,818 and Micelle-incorporated FK506 and L-685,818—Cell Differentiation Assay PC 12 cells were plated in 24 well plates at 37° C. in 5% $CO_2$ and incubated in DMEM supplemented with 5% fetal bovine serum and the treatments described below. Neurite-like outgrowth in PC 12 cells was detected after a 48 hour period using a Nikon light microscope. For each data point 5 fields of 250–300 cells/well were analyzed. For the quantitation of neurite-like outgrowth the PC 12 cells were considered to have outgrowth if their processes were longer than the length of the diameter of the cell.

Dose-response Curves for NGF, FK506 or L-685,818 Alone and the Combinations of FK 506 or L-685,818 with NGF A range of concentrations of either NGF (0.1 to 50 ng/mL), FK506 (1 to 500 nM) or L,685-818 (1 to 500 nM) alone or combinations of 0.5 or 5 ng/mL of NGF with either FK506 (5 to 500 nM) or L-685,818 (50 nM to 10 $\mu$M), were incubated with the PC 12 cells for a 48 hour incubation period. The wells with untreated cells were used as controls.

In vitro Effect of Micelle-incorporated FK506 and L-685,818 along with NGF

The unfiltered solution of the micelle incorporated drug was added to the cell wells at different concentrations: a 10 $\mu$L aliquot of a FK506-micelle solution was added to each 0.5 mL cell well. The 10 $\mu$L aliquot was produced by diluting the $1.1\times10^{-5}$ moles/L FK506-$PCL_{20}$-b-$PEO_{44}$ micelle (1% w/w) stock solution. The final concentration of FK506 in the cell well was made to range from 1 to 1000 nM. In the same manner, a 10 uL aliquot of the L-685,818 micelle solution was added to each 0.5 mL cell well, such that final concentration in the well was made to range from 10 nM to 1 $\mu$M. In each case, 5 ng/mL NGF was also added to each cell well. Several controls were also used where the cells were treated with 5 ng/mL of NGF alone, 1% (w/w) $PCL_{20}$-b-$PEO_{44}$ micelles alone, 1% (w/w) $PCL_{20}$-b-$PEO_{44}$ micelles containing 1 nM FK 506 without NGF or 1% (w/w) $PCL_{20}$-b-$PEO_{44}$ micelles containing 10 nM L-685,818.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A diblock copolymer comprising a hydrophilic block and a hydrophobic block, said hydrophilic block comprising a polyethylene oxide polymer, said hydrophobic block comprising a polycaprolactone polymer, said polycaprolactone polymer comprising a number of caprolactone monomers selected from 5 to 150, said polyethylene oxide polymer comprising a number of ethylene oxide monomers selected from 20 to 100.

2. A diblock copolymer according to claim 1, wherein the number of ethylene oxide monomers is selected from 20 to 80.

3. A diblock copolymer according to claim 2, wherein the number of ethylene oxide monomers is selected from 30 to 60.

4. A diblock copolymer according to claim 3, wherein the selected number of caprolactone monomers is 14 and the selected number of ethylene oxide monomers is 44.

5. A diblock copolymer according to claim 3, wherein the selected number of caprolactone monomers is 20 and the selected number of ethylene oxide monomers is 44.

* * * * *